US007398256B2

(12) United States Patent
Farhat (10) Patent No.: US 7,398,256 B2
(45) Date of Patent: Jul. 8, 2008

(54) DYNAMICAL BRAIN MODEL FOR USE IN DATA PROCESSING APPLICATIONS

(75) Inventor: Nabil H Farhat, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 699 days.

(21) Appl. No.: 10/468,135

(22) PCT Filed: Feb. 25, 2002

(86) PCT No.: PCT/US02/05555

§ 371 (c)(1),
(2), (4) Date: Sep. 23, 2003

(87) PCT Pub. No.: WO02/069137

PCT Pub. Date: Sep. 6, 2002

(65) Prior Publication Data

US 2004/0073415 A1    Apr. 15, 2004

Related U.S. Application Data

(60) Provisional application No. 60/270,981, filed on Feb. 23, 2001.

(51) Int. Cl.
*G06F 15/18* (2006.01)
(52) U.S. Cl. ........................................ 706/12
(58) Field of Classification Search .................. None
See application file for complete search history.

(56) References Cited

U.S. PATENT DOCUMENTS

| 4,858,147 | A |   | 8/1989 | Conwell ............... 364/513 |
| 5,109,425 | A |   | 4/1992 | Lawton .................. 382/1 |
| 5,136,687 | A | * | 8/1992 | Edelman et al. ............ 706/20 |
| 5,153,923 | A | * | 10/1992 | Matsuba et al. ............ 382/158 |
| 5,283,839 | A | * | 2/1994 | Edelman et al. ............ 382/103 |

(Continued)

OTHER PUBLICATIONS

Discrimination of speech from nonspeech based on multiscale spectro-temporal Modulations Mesgarani, N.; Slaney, M.; Shamma, S.A.;Audio, Speech and Language Processing, IEEE Transactions on [see also Speech and Audio Processing, IEEE Transactions on] vol. 14, Issue 3, May 2006 pp. 920-930 Digital Object Identifier 10.1109/TSA.2005.858055.*

(Continued)

*Primary Examiner*—Michael B Holmes
(74) *Attorney, Agent, or Firm*—Woodcock Washburn LLP (57) ABSTRACT

A system and methods offering a dynamical model of cortical behavior is provided. In an illustrative implementation, the present invention offers a corticonic network comprising at least one parametrically coupled logistic map network (PCLMN)(205). The PCLMN offers a non-linear iterative map of cortical modules (or netlets) that when executed exhibit substantial cortical behaviors. The PCLMN accepts dynamic and/or static spatio-temporal input (210) and determines a fixed point attractor in state-space for that input. The PCLM (205) operates such that if the same or similar dynamic and/or static spatio-temporal input is offered over several iterations, the PCLMN converges to the same fixed point attractor is provided rendering adaptive learning. Further, the present invention contemplates the memorization or association of inputs using the corticonic network in a configuration where the PCLMN cooperates with another cortical module model (e.g. another PCLMN, associative memory module, etc.)(215).

34 Claims, 7 Drawing Sheets

U.S. PATENT DOCUMENTS

| | | | | |
|---|---|---|---|---|
| 5,515,477 | A | | 5/1996 | Sutherland .................... 395/27 |
| 5,535,302 | A | * | 7/1996 | Tsao ........................... 706/20 |
| 5,544,280 | A | * | 8/1996 | Liu et al. ...................... 706/18 |
| 5,592,589 | A | | 1/1997 | Poon ........................... 395/24 |
| 5,911,035 | A | * | 6/1999 | Tsao ........................... 706/16 |
| 6,075,891 | A | | 6/2000 | Burman ...................... 382/191 |
| 6,172,941 | B1 | * | 1/2001 | Bieramperl .................. 368/10 |
| 6,185,337 | B1 | | 2/2001 | Tsujino et al. .............. 382/227 |
| 6,185,528 | B1 | | 2/2001 | Fissore et al. ............... 704/232 |

OTHER PUBLICATIONS

Single Evoked Somatosensory MEG Responses Extracted by Time Delayed Decorrelatin Sander, T.H.; Burghoff, M.; Curio, G.; Trahms, L.;Signal Processing, IEEE Transactions on [see also Acoustics, Speech, and Signal Processing, IEEE Transactions on] vol. 53, Issue 9, Sep. 2005 pp. 3384-3392 Digital Object Identifier 10.1109/TSP.2005.853156.*

A Model of Perceptual Learing Integrated with Top-Down Information Liu, Yun-Hui; Luo, Si-Wei; Lv, Zi-Ang; Zou, Qi; Machine Learning and Cybermetics, 2007 International Conference on vol. 6, Aug. 19-22, 2007 pp. 3538-3542 Digital Object Identifier 10.1109/ICMLC.2007.4370760.*

Towards the modeling of dissociated cortical tissue in the liquid state machine framework Goswami, D.; Schuch, K.; Yi Zheng; DeMarse, T.; Principe, J.C.; Neural Networks, 2005. IJCNN '05. Proceedings. 2005 IEEE International Joint Conference on vol. 4, Jul. 31-Aug. 4, 2005 pp. 2179-2183 vol. 4.*

Neural recordings from a benzocyclobutene (BCB) based intra-cortical neural implant in an acute animal model Clement, R.S.; Singh, A.; Olson, B.; Lee, K.; He, J.; Engineering in Medicine and Biology Society, 2003. Proceedings of the 25th Annual International Conference of the IEEEvol. 3, Sep. 17-21, 2003 pp.2176-2179 vol. 3.*

Speeding up classification of multi-channel brain-computer interfaces: common spatial patterns for slow cortical potentials Dornhege, G.; Blankertz, B.; Curio, G.; Neural Engineering, 2003. Conference Proceedings. First International IEEE EMBS Conference on Mar. 20-22, 2003 pp. 595-598.*

The required measures of phase segregation in distributed cortical processing Gunay, C.; Maida, A.S.; Neural Networks, 2001. Proceedings. IJCNN '01. International Joint Conference on vol. 1, Jul. 15-19, 2001 pp. 290-295 vol. 1 Digital Object Identifier 10.1109/IJCNN.2001.939034.*

Multi-sensor 3D image fusion and interactive search Ross, W.D.; Waxman, A.M.; Streilein, W.W.; Aguiiar, M.; Verly, J.; Liu, F.; Braun, M.I.; Harmon, P.; Rak, S.; Information Fusion, 2000. Fusion 2000. Proceedings of the Third International Conference on vol. 1, Jul. 10-13, 2000 pp. TUC3/10-TUC3/17 vol. 1.*

Perceptual segmentation and apparent tilt: psychophysical and computational analyses of neural grouping in tilt illusion Sakai, K.; Systems, Man, and Cybernetics, 1999. IEEE SMC '99 Conference Proceedings. 1999 IEEE International Conference on vol. 2, Oct. 12-15, 1999 pp. 10-15 vol. 2 Digital Object Identifier 10.1109/ICSMC.1999.825199.*

Object selection by oscillatory correlation Wang, D.L.; Neural Networks Proceedings, 1998. IEEE World Congress on Computational Intelligence. The 1998 IEEE International Joint Conference on vol. 2, May 4-9, 1998 pp. 1182-1187 vol. 2 Digital Object Identifier 10.1109/IJCNN.1998.685941.*

Sensory fusion for intelligent navigation of mobile robot Varadarajan, R.; Yuen, G.; Bodruzzaman, M.; Malkani, M.; System Theory, 1998. Proceedings of the Thirtieth Southeastern Symposium on Mar. 8-10, 1998 pp. 307-311 Digital Object Identifier 10.1109/SSST.1998.660081.*

Silicon models of visual cortical processing Theogarajan, L.; Akers, L.A.; Neural Networks, 1996., IEEE International Conference on vol. 2, Jun. 3-6, 1996 pp. 659-664 vol. 2 Digital Object Identifier 10.1109/ICNN.1996.548974.*

Spectral estimation properties of nonlinear auditory models for noisy signals Sreenivas, T.V.; Singh, K.; Niederjohn, R.J.; Heinen, J.A.; Engineering in Medicine and Biology Society, 1989. Images of the Twenty-First Century. Proceedings of the Annual International Conference of the IEEE Engineering in Nov. 9-12, 1989 pp. 679-680 vol. 2.*

Control of a robotic manipulating arm by a neural network simulation of the human cerebral and cerebellar cortical processes Allemand, S.; Burnod, Y.; Dufosse, M.; Neural Networks, 1991. 1991 IEEE International Joint Conference on Nov. 18-21, 1991 pp. 1444-1447 vol. 2 Digital Object Identifier 10.1109/IJCNN.1991.170602.*

Temporal distributed processing-TDP; no wait-states in sensory pathways-a time-based approach of cortical function Dinse, H.R.; Neural Networks, 1993. IJCNN '93-Nagoya. Proceedings of 1993 International Joint Conference on vol. 2, Oct. 25-29, 1993 pp. 1100-1103 vol. 2 Digital Object Identifier 10.1109/IJCNN.1993.716707.*

Temporal competition as an optimal parallel processing of the cerebrohypothalamic system Nakamura, K.; Neural Networks, 1993., IEEE International Conference on Mar. 28-Apr. 1, 1993 pp. 64-69 vol. 1 Digital Object Identifier 10.1109/ICNN.1993.298530.*

An analog VLSI massively parallel module for low-level cortical processing in machine vision Bisio, G.M.; Bruccoleri, M.; Cusinato, P.; Raffo, L.; Sabatini, S.P.;Microelectronics for Neural Networks and Fuzzy Systems, 1994., Proceedings of the Fourth International Conference on Sep. 26-28, 1994 pp. 207-211 Digital Object Identifier 10.1109.*

Cort-X II: The Low-Power Element Design for a Dynamic Neural Network Yuan, J.; Song, N.; Farhat, N.; Van der Spiegel, J.; Circuits and Systems II: Express Briefs, IEEE Transactions on [see also Circuits and Systems II: Analog and Digital Signal Processing, IEEE Transactions on] vol. 54, Issue 12, Dec. 2007 pp. 1130-1134.*

The PCT International Search Report dated May 31, 2002 (PCT/US02/05555).

Hillborn, R.C., Chaos and Nonlinear Dynamics, *Oxford University Press, New York*, 1994.

* cited by examiner

DYNAMICAL BRAIN MODEL FOR USE IN DATA PROCESSING APPLICATIONS

CROSS-REFERENCE TO RELATED APPLICATIONS

This application is the National Stage of International Application No. PCT/US02/05555, filed Feb. 25, 2002, which claims the benefit of U.S. Provisional Application No. 60/270,981, filed Feb. 23, 2001.

FIELD OF THE INVENTION

The present invention relates to the field of modeling brain activity for use in data processing applications. More particularly, the present invention relates to providing a dynamical brain model of the cortex for use in various data processing applications.

BACKGROUND OF THE INVENTION

Corticonics, echoing electronics, is the art of identifying anatomical an physiological attributes of cortical organization to be abstracted and used in the modeling and simulation of the cortex. Generally, the cortex, in conjunction with the subcortical centers, is responsible for all higher-level brain functions such as cognition, thought, language, memory and learning, control of the complex motor function, and possibly the more esoteric attributes of intention, awareness and consciousness. In fact, about 75% of all human brain tissue, defining the association cortices is devoted to these functions. Thereby, understanding the workings of the cortex can have profound scientific, technological, and clinical implications. Unfortunately, the intrinsic interest of these higher-level functions is equaled by the difficulties involved—both technical and conceptual—in understanding their neurobiological basis. Nonetheless, progress to further this incomplete understanding is being made through studies of brain tissue that is damaged or has lesions, from in vivo imaging of the brain, and from electrode and patch-clamp studies in non-human primates. These studies aim at developing a complementary computational approach to modeling and studying the cortex employing the concepts and tools of nonlinear dynamics.

The non-linearity and organization of cortical tissue make the cortex a high-dimensional non-linear dynamical system. As such, it exhibits in its state-space not only static (fixed point) attractors but also dynamic (periodic, quasi-periodic and chaotic) attractors depending on its location in parameter space. However, important questions remain unanswered about these brain functions and, specifically, about the role of attractors in cortical cognitive processes. An assumption is that the most obvious role for attractors is to make it possible to operate on or utilize the activity trace caused by a stimulus after the stimulus has disappeared. Several important inquiries result from this assumption. Namely, 1) Is a particular attractor associated with the recognition of a particular object or stimulus?; 2) Is the setting of cortical activity onto an attractor state synonymous with the recognition process?; and 3) Is such persistent activity needed for the formation of memory?

Current modeling practices fall short of providing answers to these resulting inquiries. Neural networks are the predominate model used to explain brain functions and how these brain functions could be mimicked in computing environments. Specifically, a neural network is an information processing paradigm that is inspired by the way biological nervous systems process information. The key element of this paradigm is the novel structure of the information processing system. It is generally composed of a large number of highly interconnected processing elements (neurons) working in unison to solve specific problems. Neural networks have an ability to derive meaning from complicated or imprecise data. This ability can be used to extract patterns and detect trends that are too complex to be noticed by either humans or other computer techniques.

However, current brain computational models do not effectively predict the behavior observed in the cortex. Stated differently, current models do not effectively choose those features of cortical organization to make salient in the model and eliminate and ignore those features of cortical organization that do not provide any added benefit. The test of the model lies in how well it can produce, predict, and synthesize cortical functions. Current models, although effective in providing a general model for brain and/or nervous system functions do not effectively and reliably model detailed cortical functions—functions that if properly modeled could provide substantial insight to how to process large volumes of data. Such insight may be applied to numerous data intensive processing applications to improve processing efficiencies. With increased processing efficiencies computing technologies could be used to automate numerous manual tasks—manual tasks that we take for granted, such as voice recognition and synthesis, data searching, basic learning, etc.

From the foregoing it is appreciated that there exists a need for comprehensive systems and methods offering a dynamical brain model, and specifically the cortex, that may be applied to various data processing applications. The present invention meets this pressing need in the art.

SUMMARY OF THE INVENTION

A system and methods to create a dynamical brain model for use in data processing and synthesis applications is provided. In an illustrative implementation, the present invention offers a corticonic network comprising at least one parametrically coupled logistic map network (PCLMN). The PCLMN offers a non-linear iterative map of cortical modules (or netlets) that when executed exhibit substantial cortical behaviors. The PCLMN accepts dynamic and/or static spatio-temporal input and determines a specific attractor in state-space for that input. The PCLMN operates such that if the same or similar dynamic and/or static spatio-temporal input is offered over several iterations, the PCLMN converges to the same attractor. As such the PCLMN engages in adaptive learning. That is, based on a series of slightly varying inputs, the same output is provided.

Further, the present invention contemplates the memorization or association of inputs using the corticonic network in a configuration where the PCLMN cooperates with another cortical model module (e.g. another PCLMN, associative memory module, etc.). In this context, the PCLMN provides an output. The output is then processed by the cooperating cortical model module to determine if the output is novel. If the output is novel, it is classified as such. However, if the output has been processed before by the cooperating cortical model module, the output is classifies as being "remembered" and may be stored as such. That is, for a repeating output of the PCLMN, the remaining modules of the cortical model operate to classify in real-time and without the aid of any memory elements if the output PCLMN data is novel or non-novel. Furthermore, in the implementation provided, the cooperating additional cortical model module operates to associate a label to the attractor output of the exemplary PCLMN. This label for each attractor is then stored in the additional cooperating cortical model module. In operation, this label is easily retrieved to identify one or more dynamic and/or static inputs offered to the cortical network.

Further, the present invention contemplates the use of a feedback loop operating from the output of the additional cooperating cortical model module to the input of the exemplary PCLMN. By having the feedback loop it is possible to design a specific and desired path in state space. The ability to design a specific and desired path in state space provides the foundation for a model of how the cortex synthesis data (e.g. speech synthesis). Further, the corticonic network can be configured to operate such that feedback loops are present between elements of a state-space path thereby modeling periodic cortical operational functions (e.g. how the cortex controls walking, breathing, etc.).

Other features of the present invention are described below.

BRIEF DESCRIPTION OF THE DRAWINGS

The system and methods providing a dynamical brain model of the cortex are further described with reference to the accompanying drawings in which.

DETAILED DESCRIPTION OF ILLUSTRATED IMPLEMENTATION

Overview

Corticonic networks are biologically inspired and are naturally suited for handling dynamic input patterns. These networks incorporate abstractions of known attributes of cortical organization and function. The overwhelming complexity of cortical tissue on the microscopic level of neuronal wiring and synaptic connections offer considerable obstacles in developing a computationally efficient microscopic approach to modeling the cortex and its functions. Despite notable progress in "reverse-engineering" the cortex on a sufficiently detailed level, many of the obstacles in modeling the cortex still remain. Specifically, the large number of neurons per millimeter cube of cortical tissue ($\sim 10^5$) and the dense connections between them ($10^3$ to $10^4$ connections per neuron, resulting to approximately 3 km of axonal lengths per $mm^3$) render the computational complexity of a detailed model of such as small volume of cortex as extensive if not exhausting. Moreover, the challenges in trying to model the entire cortex or even a cortical patch would be nearly impossible.

Simply, the challenge in modeling a complex system like the cortex is to decide which features of cortical organization to make salient in the model and which features to eliminate or ignore. This challenge is further exacerbated as the model should have the ability to predict behavior observed throughout the entire cortex. Ultimately, the test of the model lies in how well it can produce, predict, and synthesize cortical functions. With this simplification an inquiry results, namely, does the model exhibit the desired behavior because of the simplification, or despite the simplification. Accordingly, a model that describes the cortex too closely may result in an intractable model that provides little insight into desired cortical functions.

Current brain theory models attempt to model brain functions on a macro scope. The predominate model used is known as neural networks. Neural networks are premised on a processing theory inspired by biological processing systems, such as the brain. The key element to neural networks is the novel structure of the information processing systems. In the case of neural networks, the novel structure that is being emulated is the brain. In the human brain, a typical neuron collects signals from other through a host of fine structures called dendrites. The neuron sends out spikes of electrical activity through a long, thin strand known as an axon, which splits into thousands of branches. At the end of each branch, a structure called a synapse converts the activity from the axon into electrical effects that inhibit or excite activity from the axon into electrical effects that inhibit or excite activity in the connected neurons. When a neuron receives excitatory input that is sufficiently large compared with its inhibitory input, it sends a spike of electrical activity down its axon. Learning occurs by changing the effectiveness of the synapses so that the influence of one neuron on another changes. Neural networks are constructed premised on an understanding of the essential features of neurons and their interconnections. The networks may be modeled in a computing environment (e.g. software) to simulate this understanding. These models, however, are gross idealizations of real networks of neurons since the knowledge of neurons and their interaction is incomplete.

Specifically, present day neural network and connectionist models of the cortex have not been effective in duplicating higher-level brain function and especially the ability of the. cortex/brain to process dynamic input patterns (e.g., the spatio-temporal signals furnished by sensory organs under the influence of a complex uncontrolled and dynamic environment or alternately due to deliberate dynamic exploration of stationary environment or its reflexive exploration as by fast saccadic eye movement or touch). These shortcomings may be rooted in the models' use of simplistic transfer-function description of processing elements and the use of the stimulus-response paradigm that both together or independently do not accurately represent the way the cortex reacts to sensory information. The cortex is the seat of all higher-level brain function such as cognition, thought, language, memory and learning, control of complex motor functions and possibly the more esoteric attributes of attention, awareness and consciousness. Accordingly, a better understanding of cortical dynamics can have profound scientific, technological, clinical, and economic implications.

The present invention aims to ameliorate the shortcomings of currently used models by providing comprehensive systems and methods to effectively model cortical functions such that the model is salient and maintains necessary level of abstractions so as to better describe cortical organizational and computational functions. The present invention is premised on a different viewpoint than the traditionally accepted and employed transfer-function and stimulus-response paradigm. This new viewpoint is that the cortex is a high-dimensional nonlinear dynamical system that is continually active because of extensive feedback and reentrant signaling. The effect of the extrinsic (sensory) input patterns, which are usually dynamic, is to alter the system's state-space picture leading to behavioral changes and to adaptation and learning. Accordingly, the behavior of the cortex is viewed as determined by the conjugation of extrinsic stimulus with the internal dynamics of the system that serve to furnish the context within which the sensory input gets processed and interpreted.

In an illustrative implementation, the system of the present invention comprises at least one parametrically coupled logistic map network (PCLMN) that act to model the cortex as groups of tightly coupled neurons that form basic functional units known as netlets or cortical columns. The PCLMN allows for effective modeling of cortical functions using a difference equation that represent the neurons in the netlet or columns rather than having to solve for coupled systems of nonlinear differential equations. As such, the present invention is computationally more effective and provides a basis for investigations relating to the spatio-temporal dynamics of large assemblies of PCLMs in real time and, more particularly, to determine the consequences of modeling the cortex with networks of PLCMs.

The PCLM exhibits significant corticomorphic behavior. Such behavior includes: the handling of dynamic (i.e. spatio-temporal) input patterns, self-organization, and autonomous (unsupervised) learning from one exposure ("one shot" learning) driven by mutual-information (MI—information theoretic measure of the flow of information between elements of a network), memory formation with negligible cross-talk, emergence of stimulus (input) or specific isolated clusters of activity reminiscent to hot spots of brain activity routinely pinpointed by functional magnetic resonance imaging (fMRI), automatic detection and reduction of redundancy in input patterns leading to sparse internal representations that boost storage capacity, provision of huge number of coexisting attractors available for input patterns to draw upon, computing with diverse attractors possessing basins of attraction that furnish a mechanism for learning with generalization, and a role for synchronicity, bifurcation, symmetry-breaking, and chaos in the operation of the new class of networks.

In operation, the PCLMNs are arranged in various configurations and maintain various configuration variables to provide a comprehensive and dynamical model of cortical organization and computational functions. As such, the present invention offers comprehensive system and methods to overcome the shortcomings of the art.

Illustrative Dynamical Brain Model

Figure 1:
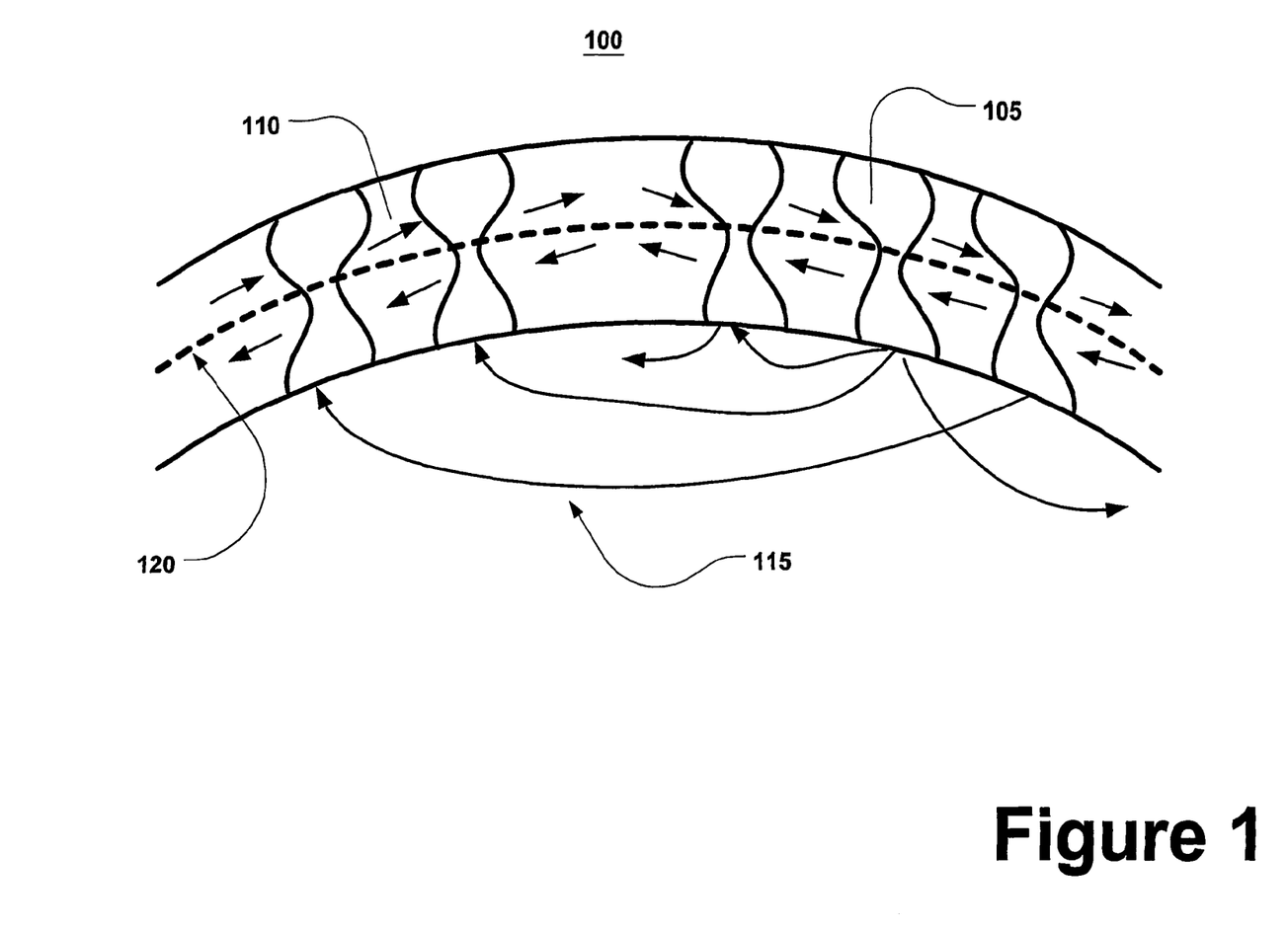
FIG. 1 is a block diagram of an exemplary schematized unfolded and flattened cortical patch in accordance with the present invention.

There are several salient features and principles of cortical organization that shed light on the efforts of developing a computationally efficient model and macroscopic theory of the cortex. One such organizational principle is the view of an unfolded and flattened cortex as a 2-D array of vertical units (vertically oriented modules, columns, or netlets of neurons). As shown in FIG. 1, cortex patch 100 comprises vertically oriented modules, columns, or netlets of neurons 105. These netlets engage in short-range (intercortical) communications as indicated by arrows 110, and in long-range cortico-cortical connections 115. It is understood that these netlets operate to pass information between each other when processing data through axonal fibers 120. The nature and method of this operation provides the basis for cortical organization and computational functions.

As shown in FIG. 1, an illustrated second cortical organizational principle suggests that the basic functional unit in the cortex is the cortical module (or netlet) and not the single neuron. The cortical module (or netlet) consists of a columnar organization of $10^3$-$10^4$ cortical neurons acting as a functional unit and that a netlet has emergent functional behavior that can be mathematically modeled by a parametrically coupled (i.e. driven) logistic map (PCLM). Logistic maps are further described by, *Chaos and Nonlinear Dynamics*, R. C., Hillborn, Oxford University Press, New York (1994), which is herein incorporated by reference in its entirety. The PCLM may be considered a non-linear iterative map of the unit interval having extremely rich and complex behaviors. It is also understood that cortical modules (netlets) interact via two types of connections, local connections, i.e. via close-range connections mediated by horizontal intercortical connections 110, and via longer-range cortico-cortical connections 115 that connect modules (columns) in different parts of the cortex or a cortical patch 100 through axonal fibers (association fibers) 120.

Although there is little detailed information about how short and long range cortical connections augment each other and contribute to the cortex's processing power, it is understood that the short-range intercortical connections between the modules form a network that engages in a non-linear space-time filtering of dynamic sensory input activity relayed to it by the thalamus and the sensory cortices. The action of this network has been observed to self-organize under the influence of initial inputs so as to produce stimulus-specific sparse patterns of activity for all subsequent inputs. Such sparse activity drives other parts of the cortical columns assumed to form another network through the long-range cortico-cortical connections and to engage in associative learning and memory formation.

As seen in FIG. 1, the illustrated connections 110 and 115 can be described as each column 105 being arbitrarily subdivided across the cortical layers into two interacting subunits. Each subunit comprises a netlet that may be modeled by a PCLM. One netlet pair (PCLMN) forms a first network, PCLMN1, via the short-range intercortical connections 110, while the other netlet pair (PCLMN) forms a second network, PCLMN2, via the longer-range cortico-cortical connections. In operation, the two networks interact to realize the storage and retrieval of global activity patterns. Based on this description, a corticonic model of the cortex is created. The network includes, as its basic ingredients, the role of both sort-range and long-range connections in memory formation, specific architecture or connectivity, nonlinear activity-dependent coupling between processing elements, self-organization through autonomous adaptation of coupling factors driven by mutual information (MI). The remaining ingredients of the model are the PCLMs as the processing elements in the network. These PCLMs mathematically model the complex emergent behavior of a cortical column or netlet, and the gradual transfer of control over the dynamics from extrinsic control to intrinsic control (i.e. by the input pattern, or by internal feedback to generate persistent activity patterns constituting attractors that characterize the input stimulus depending on the state of coupling in the network).

Illustrative Corticonic Network

Figure 2:
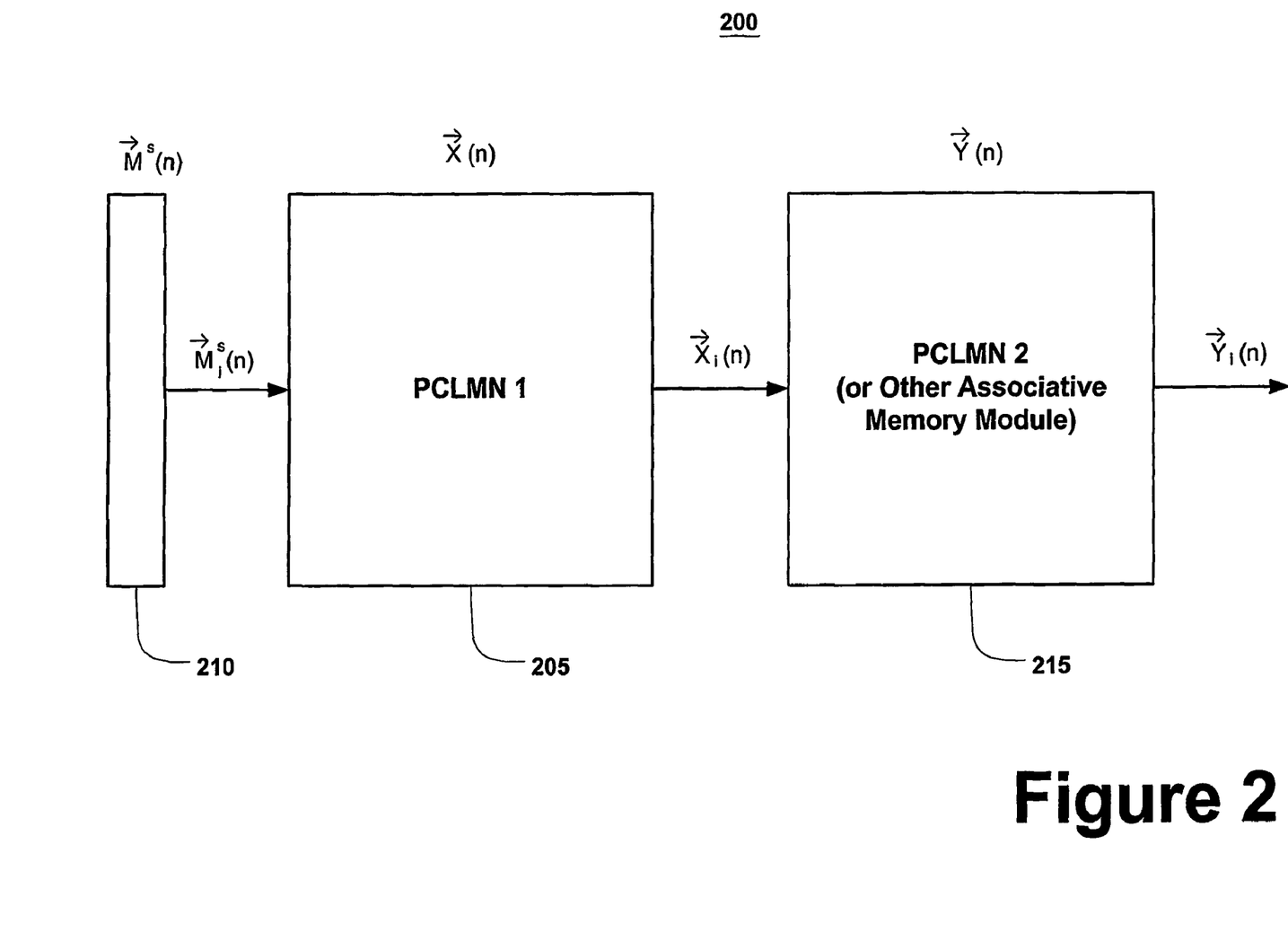
FIG. 2 is a system diagram of an exemplary corticonic network for use in a dynamical brain model in accordance with the present invention.

FIG. 2 shows an illustrative corticonic network 200. As shown in FIG. 2, two PCLMNs are connected in tandem. The first PCLMN1 205 has local (self and nearest) neighbor connections that model the close-range intercortical connections. In operation, it engages in space-time filtering of dynamic input patterns 210 that represent sensation related to dynamic input patterns relayed to the cortex by the thalamus and the sensory cortices. In the implementation provided, these input patterns 210 may be regarded as dynamic feature vectors $\vec{X}^s(n)$. The function of PCLMN1 205 is to reduce redundancy in the input pattern $\vec{X}^s(n)$ by producing for every input pattern a persistent stimulus-specific sparse pattern for activity designated $\vec{X}(n)$ which can be viewed as an attractor. This is accomplished by fine-tuning its initial coupling matrix via an autonomous (unsupervised) adaptation algorithm driven by mutual information (MI) of the pair-wise activities (orbits) of processing elements (PEs) in the network. This behavior constitutes a process of self-organization by MI and therefore by the flow of information in the PCLM networks. As a result of its limited (self and nearest neighbor) coupling, PCLMN1 210 does not distinguish between novel and familiar inputs despite the adaptation of its initial coupling matrix. This task is relegated to PCLMN2 215 that converts the input to a second persistent activity pattern (attractor) $\vec{Y}(n)$ that characterizes $\vec{X}(n)$. The adaptation of the elements of the coupling matrix of PCLMN2 215 is also driven by mutual information. The configuration of PCLMN2 215 (e.g. the equations used to model PCLMN2) endow it with the cognitive ability of distinguishing a novel input $\vec{X}(n)$ from a familiar one and the ability of autonomously learning the novel, but only producing the appropriate response (attractor) for the familiar.

It is appreciated that although the exemplary corticonic network 200 is shown having a configuration of two PCLMNs in tandem that such configuration is merely exemplary as the present invention contemplates a corticonic network model having one or more PCLMNs, associative memory modules, or other brain (cortical) modeling module cooperating various configurations to achieve the inventive concepts described herein.

The processing elements, the PLCMs, within each PCLMN1 205 and PCLMN2 215 interact via fixed connectivity patterns. The connectivity patterns within both networks are random and so are the initial connection strengths. In doing so, the useful function of these networks is to a large degree the result of self-organization via adaptation and learning and to a lesser degree due to any initial inbuilt structure. This enables two corticonic networks immersed in the same environment and therefore subject to the same types of stimuli, to end-up acquiring the same behavior through learning, even through their initial connectivity patterns are not the same. The random connection patterns once set, to reflect the local and semi-global (wiring) of the cortex, remain fixed; only the strength of the connections, i.e. the coupling strengths matrix, is altered by MI driven adaptation. The coupling of the PCLMNs may be represented as coupling matrices $\vec{C}$. The coupling between the networks may be considered to be one-to-one. The initial coupling factors matrix of PCLMN1 205 is local with self-coupling (diagonal elements) and nearest neighbor coupling set with the probability Pr<1 (i.e. note every element in PLCMN1 205 is connected to its nearest neighbors). In contrast, the coupling factors matrix of PCLMN2 215 is set to be semi-global, sparse and void of self-coupling (i.e. no diagonal elements) and also void of short range connections.

The PCLMNs of FIG. 2 (i.e. PCLMN2 205 and PCLMN2 215) may be further described by their one dimensional topologies to enable the display of the evolution of their state vectors $\vec{X}(n)$ and $\vec{Y}(n)$, respectively. Both networks employ nonlinear activity dependent coupling functions between processing elements which are more general than linear coupling. Nonlinear coupling contributes to the self-organization of the network through competing forces of order and disorder. In addition, in PCLMN1, control over the dynamics of the network is transferred gradually from initially entire extrinsic control by the applied stimulus 210 to eventually intrinsic control. Both networks have double dynamics proceeding at different rates: fast dynamics controlling the evolution of the state vectors, i.e. the states of the PEs (the PCLMs), and slower dynamics controlling the evolution of the coupling strengths between the PEs.

PLCMN1 205 is described by the following mathematical formulation. Specifically, the orbit of $X_i(n)$ of the $i^{th}$ PCLM or PE in PCLMN1 205 may be expressed by, $$X_i(n+1)=\mu_i(n)X_i(n)(1-X_i(n)) i=0,1,\ldots N-1 \text{ and } n=0,1,2, \quad (1)$$

Where $X_i(n)$ is confined to the interval [0,1], and $\mu_i(n)$ to the interval [0,4]. The initial state $X_i(0)$ in equation 1 is selected randomly in [0,1] with uniform probability, while the parameter $\mu_i(n)$ is taken to be a function of the extrinsic stimulus (input) 210 $X_i^s(n)$ and the intrinsic input (feedback) from other elements in the network connecting to the $i^{th}$ element in accordance to, $$\mu_i(n) = \mu_i^s(n)e^{-\alpha n} + \frac{1-e^{-\alpha n}}{N_i} \sum_{j \in |N_i|} g_{i,j}(X_j(n)) \quad (2)$$

where, $$\mu_i^s(n)=4(X_i^s(n))^{C_i^s} \text{ and} \quad (3)$$

$$g_{ij}(X_j(n))=4(X_j(n))^{C_{ij}} \quad (4)$$

are nonlinear activity dependent coupling functions, the first of which represents the coupling of the $i^{th}$ input $X_i^s(n)$ into the network, and the second the coupling of the $j^{th}$ element to the $i^{th}$. $C_i^S$ and $C_{ij}$ are positive real coupling factors that control the form of the activity dependent coupling function and furnish the means for incorporating autonomous adaptation learning in the corticonic net. The set $|N_i|$ is the number of elements connecting to the $i^{th}$ element.

Taking a closer look at the right hand side of equation (2), the first term represents the effect of the external input $X_i^s(n)$ and decays exponentially in time with rate constant $\alpha$; the second term represents the effect of internal feedback from other elements which is seen to grow exponentially in time with rate constant $\alpha$. In this fashion, as the effect of the first term diminishes getting weaker in time, that of the second term becomes stronger effecting thereby the transfer of control over the dynamics of PCLMN1 205 from extrinsic to intrinsic control. This handing-over of control over the dynamics of extrisic to intrinsic is to avoid the network being permanently forced by the input, giving thereby an opportunity for the interactions between its elements to exert their influence in determining the final state (convergent state) of the network. This, however, does not mean that the final state bears no relation to the resolved attractor $\vec{X}^*(n)$; to the contrary, the final state is stimulus specific. The first term in equation (2) is an exponentially decaying forcing function that acts in effect as a "soft" initial condition that guides the network to certain region of its state-space where the exponentially increasing intrinsic dynamics, represented by the second term in equation (2), gradually take over leading the network to an attractor, a persistent stimulus-specific state characteristic of the particular $\vec{X}^s(n)$. When these equations are simulated, it is observed that the final state (attractor) reached by PCLMN1 205 is dependent of $\vec{X}^s(n)$, its coupling factors function matrices ($\vec{C}^s$, $\vec{C}$) and is independent of the initial state $\vec{X}(0)$.

In operation, responding to a first stimulus, PCLMN1 205 having symmetry breaking, initial local random connectivity, and coupling, generates chaotic excitation (activity) that represents the immense space of possible configurations (e.g. co-existing attractors) the network is capable of maintaining. The number of possible states (coexisting attractors) is immense even for a modest size network. The description of the state-space is observed to occur through a cascade of bifurcations driven by mutual information, i.e. by the flow of information between elements of a network. The resulting adaptation of the initial coupling strengths matrix constitutes self-organization of PCLMN1 205 caused by the first applied stimulus. The application of a second stimulus to the adapted PLCMN1 205 causes further self-organization but less vigorously than occurred with the first applied stimulus. The MI driven adaptation and self-organization become progressively less vigorous with the application of further new stimuli (inputs) until a structured coupling factor matrix $\vec{C}$ is reached where applied stimuli cause no adaptation but merely select directly one of the coexisting attractors.

Under simulation, PCLMN1 205 is observed to self-organize by adapting its initial random coupling strengths matrix into a stable structure matrix that endows it with the very desirable attributes and properties. Namely, the ability to rapidly convert every distinct input stimulus, regardless of whether it is static or dynamic, into a distinct attractor that is one of an immense number of coexisting fixed-point attractors the network can possess. Furthermore, it provides evidence that attractors possess basins of attraction in stimulus space. The convergence of the adapted (self-organized) PCLMN1 205 to stimulus specific attractors occurs very rapidly. Also, PLCMN1 205 maintains the ability to detect and remove redundancy (regularity and form) in the applied stimulus such to transmit or convert the input into the compact form of an attractor lending to the operation of creating memory or association.

As shown in FIG. 2, corticonic network comprises a second PCLMN2 215. PCLMN1 205 and PCLMN2 215 may be coupled to model memory and association cortical functions. Specifically, PCLMN2 215 may be configured such that it is able to accept the set of persistent output activities (attractors) $\vec{X}(n)$, produced by PCLMN1 205 and map them into a new set of attractors in such a way that only a novel $\vec{X}(n)$, not seen by PCLMN2 215 before, would trigger its adaptation to get "learned" and memorized as a characterizing attractor. This operation is performed such that when the identified attractors (i.e. identified by PCLMN2 215) are observed again they would be treated as a familiar input that, merely elicits, or reconstructs the characterizing attractor without triggering adaptation. This memory process occurs such that the adaptation by and learning of novel input would not interfere with earlier memories/attractors formed in PCLMN2 215. In this manner, the simple tandem connection of PCLM1 105 and PCLMN2 15 in FIG. 2 forms corticonic network 200 processing he desirable attributes of PCLMN1 205 augmented by the cognitive ability of PCLMN2 215 of differentiating between familiar and novel inputs by learning the novel and producing the proper response for the familiar.

Akin to PCLMN1 PCLMN2 215 is mathematically modeled to be described by the following equations (i.e. the evolution of state-vector $\vec{Y}(n)$), $$Y_i(n+1)=\lambda_i(n)Y_i(n)(1-Y_i(n)) i=0,1,2, \ldots N-1 \text{ and } n=-, 1,2, \tag{5}$$

and $$\lambda_i(n) = 4(X_i(n))^{C_i} \left[ e^{-\gamma n} + (1 - e^{-\gamma n}) \min\left\{ \sum_{j \in |N_i|} (Y_j(n))^{C_{ij}}, 1 \right\} \right]$$

where $\gamma$ is a positive real constant, $N_i$ is the number of maps (i.e. PCLMs or processing elements (PE)) connecting to the $i^{th}$ map, $|N_i|$ is the set of indices of all maps connection to the $i^{th}$ map, $C_i^S$ is a fixed positive real constant determining how different values of the stimulus $X_i(n)$ (i.e. the output of PCLMN1205 influence the $i^{th}$ map or PE. $C_{ij}$ is the coupling factor between the $j^{th}$ and $i^{th}$ maps (PEs) that get adapted from initial value $C_{ij}(0)$ by the mutual information (MI) between the $j^{th}$ and $I^{th}$ orbits as in PCLMN1 205.

Using these equations, corticonic network 200 may be simulated in an exemplary computing application to show how PCLMN1 205 realizes adaptive response to dynamic and/or static inputs and correspondingly how the tandem PCLMN1 205 and PCLMN2 215 combination offers memory and/or association operations for one or more inputs. These important operations offer a simple, workable, and robust model of desired cortical organization and computational functions. The reliability of this model is verified through comparisons to biological cortical functions as observed through functional Magnetic Resonance Imaging (fMRI) studies.

Figure 2A:
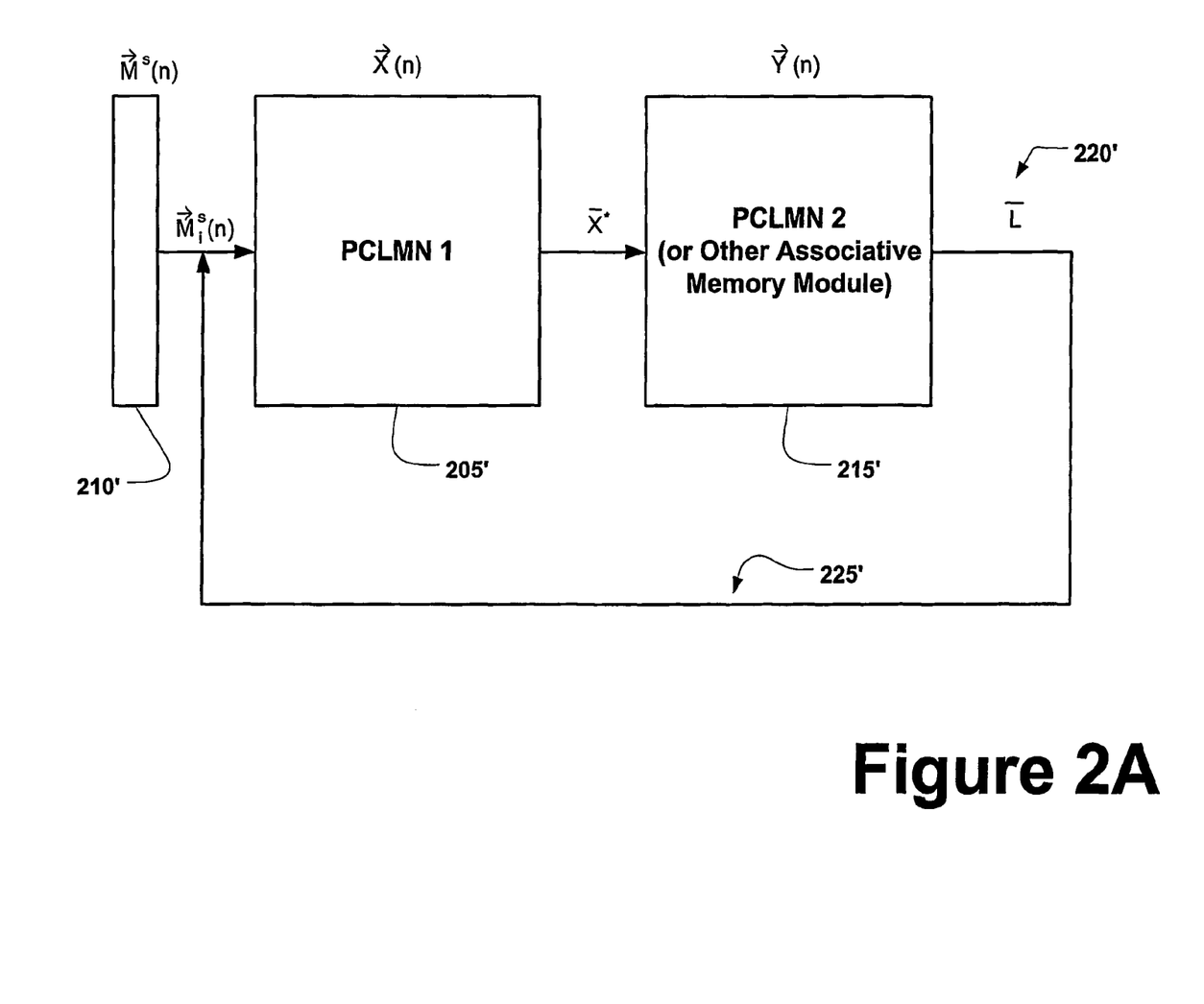
FIG. 2A is a system diagram of the exemplary conrticonic network having a feedback loop to allow for state-space path design for us in a dynamical brain model in accordance with the present invention.

FIG. 2A shows an alternate implementation of corticonic network 200'. As shown, corticonic network comprises PCLMN1 205' accepting dynamic and/or static inputs from input source 210. PCLMN1 205' is tandemly coupled to additional cortical model module 215' (e.g. PCLMN, associative memory, etc.) such that the output attractors of PCLMN1 205' act as input to additional cortical model module 215'. Further, the output of additional cortical model module 215' is fed back through feedback loop 225' to act as input to PCLMN1 205'.

Figure 3:
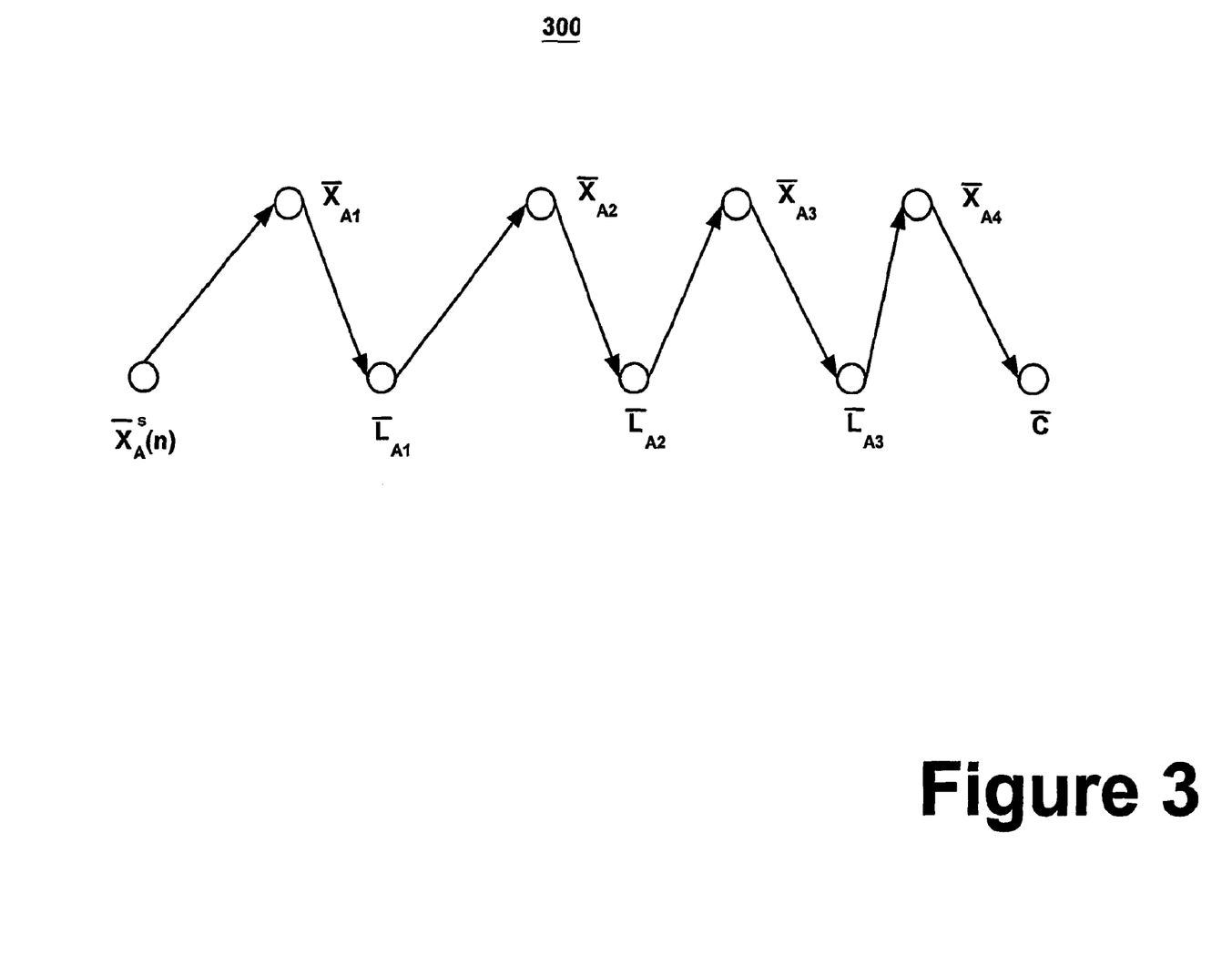
FIG. 3 is a chart diagram of an exemplary state-space trajectory in accordance with the present invention.
Figure 3A:
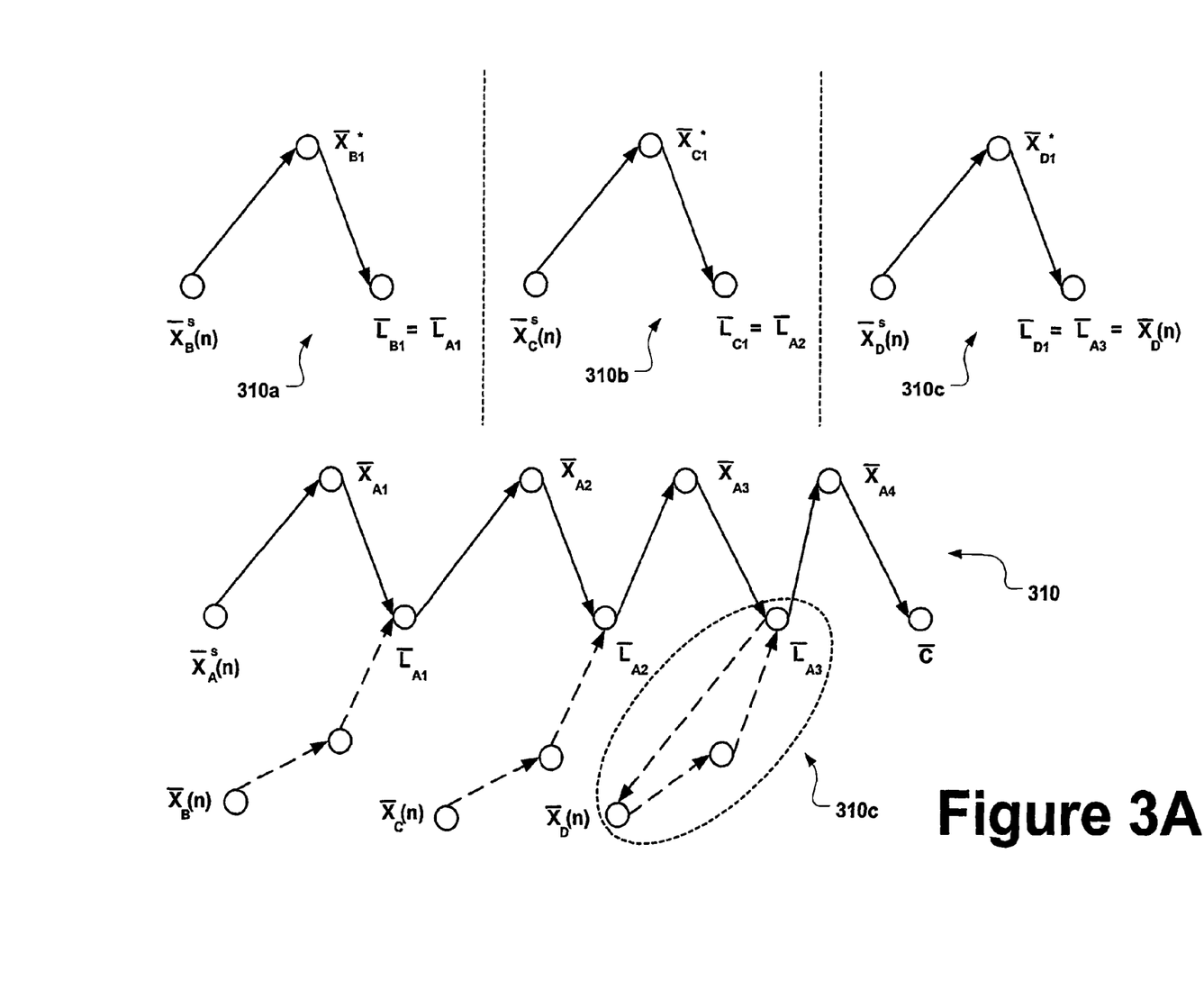
FIG. 3A is a chart diagram of an exemplary state space trajectory wherein periodic cortical operation functions and cortical abstraction are represented in accordance with the present invention.

In operation, corticonic network 200' of FIG. 2A allows for the design of a desired path in state-space (as illustrated in FIGS. 3 and 3A). Stated differently, corticonic network 200' can be formed by PCLMN1 205' coupled in tandem with a hetero-associative memory 215' to model the thalamo-cortical complex of the brain. Because of the enormous number of coexisting input-specific attractors held in PCLMN1 205, ebery input pattern (e.g. feature vector $\mu_i^s(n)$) is guaranteed to produce a fixed-point attractor as output. The role of the hetero-associative memory 215' is to tag the attractors of the PCLMN, produced by the individual inputs, with labels ($\vec{L}$ 220') so as to identify the inputs. With feedback 225' and systematic pairing of attractor-label associations stored in thee associative network (memory), it is possible to form a predetermined sequence of associations (patterns) in response to an input. This is equivalent to forming a trajectory (as shown in FIGS. 3 and 3A) in the state-space of corticonic network 200'.

FIGS. 3 and 3A show exemplary desired trajectories existing in state-space. As shown in FIG. 3, state-space trajectory 300 comprises a series of fixed point attractors and labels. These fixed point-attractors and labels have known positions in state-space. Accordingly, it is possible to generate a desired trajectory in state-space by providing an input that will produce the an attractor that represents the first point of a desired trajectory in the state space (e.g. $\vec{X}_{A1}$). This attractor is provided with a label (e.g. $\vec{L}_{A1}$) having its own position in state space and representing the second point along the desired trajectory. The label is the feedback into the corticonic network to produce a second attractor (e.g. $\vec{X}_{A2}$) that represents a third point along the desired trajectory. The second attractor is labeled and then the label is fed back. This process continues until the final point of the desired trajectory (e.g. $\vec{C}$) is reached.

Specifically, state-space trajectory 300 is generated as input $\vec{X}^s_A(n)$ is processed by corticonic network 200' according to the above-described operation to produce the fixed-point attractor $\vec{X}_{A1}$ which in turn is then provided the label $\vec{L}_{A1}$. Label $\vec{L}_{A1}$ then acts as input to corticonic network 200' that processes $\vec{L}_{A1}$ to produce a second fixed point attractor $\vec{X}_{A2}$. The second fixed point attractor is then provided the label $\vec{L}_{A2}$ which in turn is fed back to the network to produce a third fixed-point attractor $\vec{X}_{A3}$. Similarly, fixed point attractor $\vec{X}_{A3}$ is provided with a label, $\vec{L}_{A3}$ that is fed back into corticonic network 200' to produce fixed-point attractor $\vec{X}_{A4}$. Fixed point attractor $\vec{X}_{A4}$ is then labeled as the final point $\vec{C}$ along desired state-space trajectory 300.

In providing the ability to design a trajectory in state-space, the present invention allows for predictive data synthesis based on single input. This aspect of the cortical model of the present invention may be incorporated in data processing applications to synthesize predictive data, such as speech. That is, spoken words can be modeled temporal vectors having certain trajectories in state-space of N dimensions. A computing application having incorporated the model of the present invention would be able to synthesize spoken words based on a single input.

FIG. 3A shows additional capabilities of the present invention as relating to designing and executing trajectories in state-space. As shown, state-space trajectory 300 of comprises a number of fixed point attractors and labels. State-space trajectory 310 is similar to state-space trajectory 300 of FIG. 3 but as seen has various additions (as indicated by dotted lines). Similar to the process described in generating state-space trajectory 300 of FIG. 3, state-space trajectory 310 is generated by providing a first input $\vec{X}^s_A(n)$ that produces a first attractor $\vec{X}_{A1}$ and first label $\vec{X}_{A1}$. Label $\vec{L}_{A1}$ is fed back into corticonic network 200' (of FIG. 2A) to produce second attractor $\vec{X}_{A2}$ having a second label $\vec{L}_{A2}$. The feed back process is repeated until the final state-space trajectory point $\vec{C}$ is reached. Unlike, state-space trajectory 300 that accommodates a single input, state-space trajectory 310 is shown to accommodate several inputs $\vec{X}^s_A(n)$, $\vec{X}_B(n)$, $\vec{X}_C(n)$, and $\vec{X}_D(n)$. Further, $\vec{X}_B(n)$, $\vec{X}_C(n)$, and $\vec{X}_D(n)$ are different than $\vec{X}^s_A(n)$ in that the labels of the attractors that are produced as a result of these inputs are labels of points found along the trajectory of state-space trajectory 300 as described by attractor-label relationship diagrams 310a, 310b, and 310c respectively. Specifically, as shown in relationship attractor-label 310a input $\vec{X}^s_B(n)$ produces attractor $\vec{X}^*_{B1}$ that in turn is assigned with label $\vec{L}_{B1}$. However, as shown, $\vec{L}_{B1}$ is not a unique label, but rather is the same label as $\vec{L}_{A1}$ of state-space trajectory 300. As a result, and as seen on state-space trajectory 310 in FIG. 3A, the state-space trajectory for input $\vec{X}^s_B(n)$ intersect that of state-space trajectory 300. The same holds true for inputs $\vec{X}^s_C(n)$ and $\vec{X}^s_D(n)$. That is, the resulting state-space trajectories for inputs $\vec{X}^s_C(n)$ and $\vec{X}^s_D(n)$ intersect the state-space trajectory 300 at different points along state-space trajectory. This results as the label $\vec{L}_{C1}$ assigned to resulting attractor $\vec{X}^*_{C1}$ is the same as label $\vec{X}_{A2}$ as shown in attractor-label relationship diagram 310b. Similarly, label $\vec{L}_{D1}$ assigned to resulting attractor $\vec{X}^*_{D1}$ is the same label as label $\vec{L}_{A3}$ as shown in attractor-label relationship diagram 310c. Further attractor relationship diagram 310c shows that $\vec{L}_{D1}$ has the same value as the original input $\vec{X}_D(n)$.

State-space trajectory 310 describes two features of cortical organization and computation that the present invention has modeled. First, dissimilar instantiations of the concept $\vec{C}$ of an object are provided. For example, if the four inputs $\vec{X}^s_A(n)$, $\vec{X}^s_B(n)$, $\vec{X}^s_C(n)$, $\vec{X}^s_D(n)$ are feature vectors describing the concept of a chair the present invention is capable of designing a state-space trajectory such that the "chair" objects (i.e. feature vectors) are abstracted (converge) to a concept $\vec{C}$ (state-space position) of a chair. The cortex operates such that it can identify and store concepts for a range of objects that have features relating to the concept. In the example of a chair, the cortex can identify a number of various objects based on the concept chair, i.e. a construct to place items or to sit on. This concept may encompass a number of features such as legs, a back, a seat, a horizontal surface, etc. The present invention achieves the abstraction of a concept by allowing for the design of specific state-space trajectories that can accommodate multiple inputs and converge these inputs through the assignment of similar labels to a specific state-space position.

The second cortical feature highlighted by state-space trajectory 310 is the realization of periodic functions. As shown in encircled region 310c' the present invention allows for the creation and implementation of a feedback loop among points along the state-space trajectory itself. Encircled region 310c' goes further to describe the attractor-label relationship of attractor $\vec{X}^*_{D1}$ with input $\vec{X}^s_D(n)$ and labels $\vec{L}_{D1}$ and $\vec{L}_{A3}$. As seen a feedback loop is generated between label $\vec{L}_{A3}$ and $\vec{L}_{D1}$. This loop represents the control of periodic function by the cortex. For example, walling is periodic function controlled by the cortex. It requires the movement of the first leg which is modeled by input $\vec{X}^s{}_D(n)$ that creates attractor $\vec{X}^*{}_{D1}$ having label $\vec{L}_{A3}$. Once that first leg is moved, the second leg requires moving. Accordingly, input $\vec{X}^s{}_D(n)$ is required. This is achieved by equating label $\vec{L}_{A3}$ with input $\vec{X}^s{}_D(n)$. The result is a periodic movement of command-move leg, step, move leg, step, etc. Once again the present invention provides a basis to model advanced cortical functions that existing cortical models are either incapable of modeling, or alternatively, are extremely inefficient in modeling.

Figure 4:
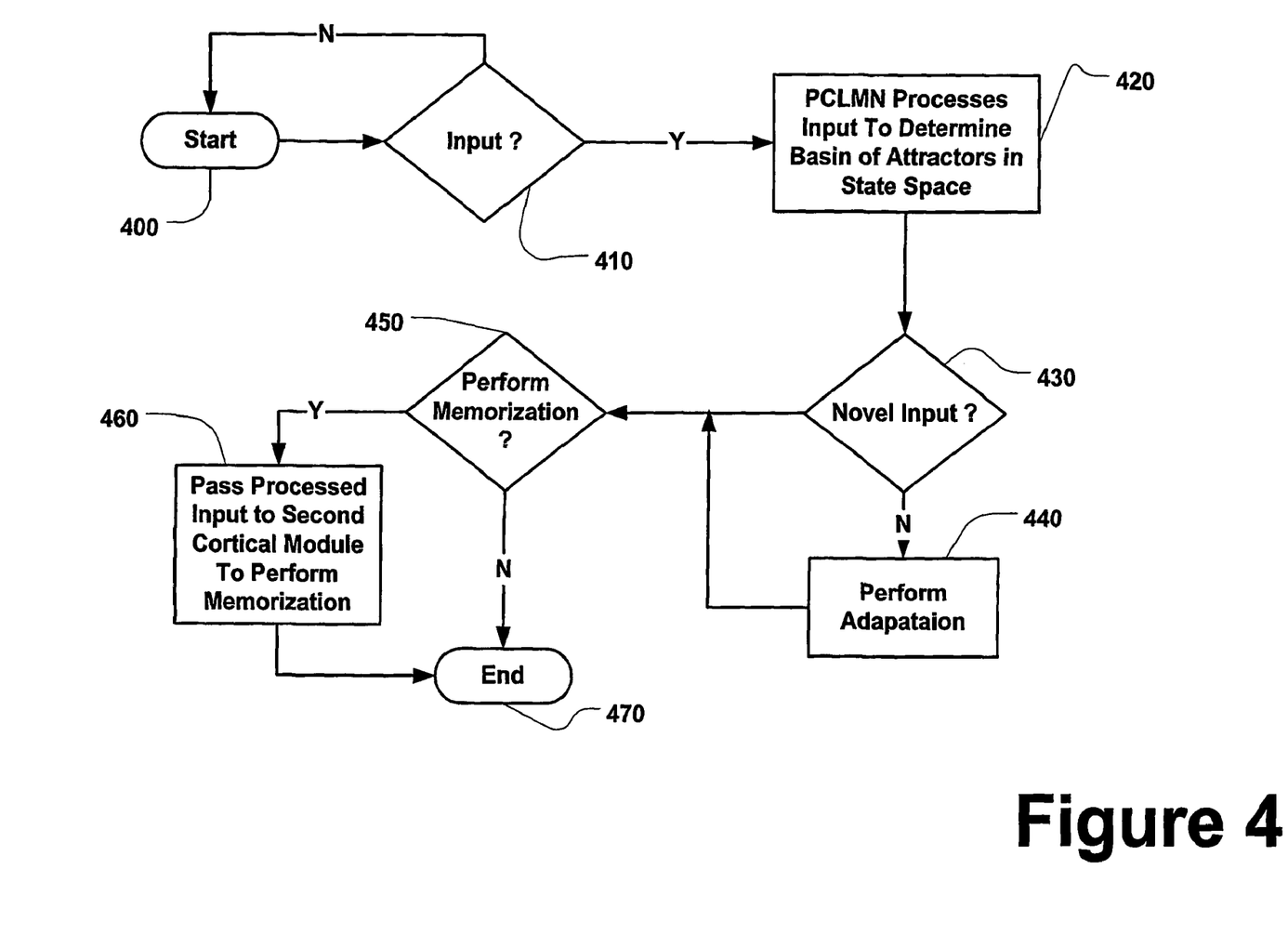
FIG. 4 is a flow diagram of the processing performed by the exemplary dynamical cortical model system of the present invention when processing inputs to realize adaptive learning.

FIG. 4 shows the processing performed to create a dynamical brain model in accordance with the present invention. As shown, processing begins at block 400 and proceeds to block 410 where a check is performed to determine if a dynamic and/or static input has been provided. If an input has not been provided, processing reverts to block 400 and proceeds there from. However, if at block 410 an input has been detected, processing proceeds to block 420 where the input is processed by the PCLMN to establish a basin of attractors (or a single attractor) in state-space. A check is then performed at block 430 to determine if the input is novel. If the input is novel, processing proceeds to block 450 and proceeds there from. However, if the input is deemed not to be novel at block 430, processing proceeds to block 440 where the PCLMN undertakes adaptation of the input. From there processing proceeds to block 450 where a check is performed to see if the input is to be memorized or associated. If it is not, processing terminates at block 470. However, if the input is deemed to be memorized or associated, processing proceeds to block 460 where is it processed by a second cortical module (e.g. PCLMN, associative memory, etc.) where memorization or association occurs. Processing then terminates at block 470.

Figure 5:
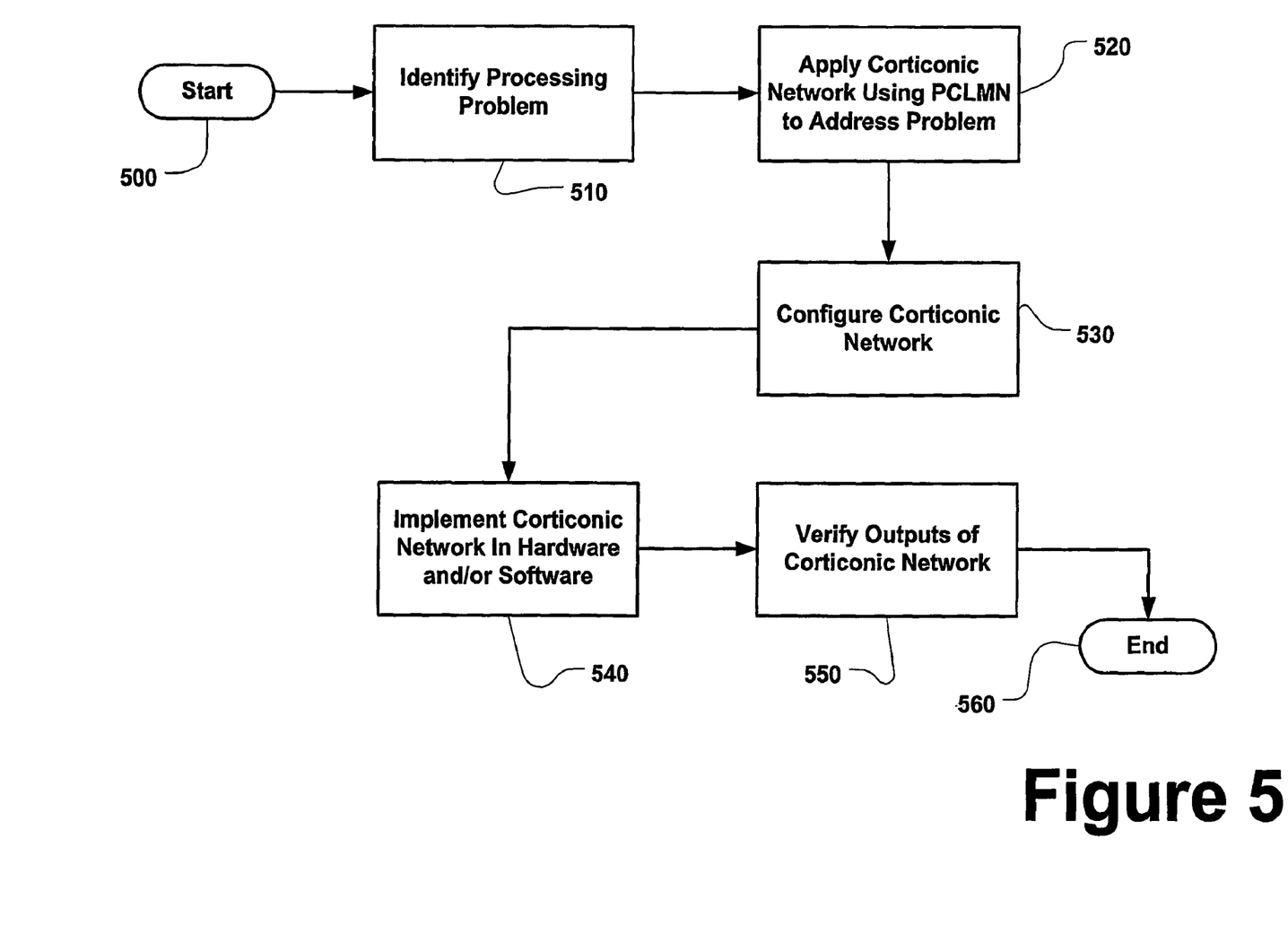
FIG. 5 is a block diagram showing of the processing performed to apply the exemplary dynamical cortical model of the present invention when to data processing applications.

FIG. 5 shows the processing performed to apply the dynamical brain model of the present invention to data processing applications resulting in applications that process data in accordance to modeled cortical functions that improves processing efficiencies. As shown, processing begins at block 500 and proceeds to block 510 where a processing deficiency is identified. From there, processing proceeds to block 520 where the corticonic network (using the inventive concepts described herein) is designed to meet the needs of the identified problem. At block 530, the cortical network is configured with parameters to address the identified problem. From there processing proceeds to block 540 where the corticonic network is built via exemplary computing software and hardware to execute processing to overcome the identified processing problems. At block 550 the results of the corticonic network are verified. From there processing terminates at block 560.

Exemplary Data Processing Application Using Dynamical Brain Model

The dynamical brain model of the present invention may be applied to numerous data processing application to improve efficiencies and provide more relevant results. It is appreciated that the data processing application described herein is exemplary as the inventive concepts described herein may be applied to various data processing applications including but not limited to database processing and management applications, sonar application, radar applications, voice recognition and/or synthesis applications, etc.

The corticonic network of the present invention may be employed in an object recognition concept inspired by the sounding and recognition system of certain echo-locating mammals (e.g. the dolphin). It is well known that the dolphin uses sound not only to navigate and explore its environment, but also to achieve and uncanny ability to recognize objects in its environment. It has also been observed in controlled experiments that slight changes occur in the emission, the click, waveform used by the dolphin while it is engaging in a recognition task and that the click waveform stops changing, i.e. converges, once recognition seems to have been achieved. It is as if the dolphin is changing its emissions to discern the object better. Such operation is puzzling since it remains a question how the dolphin succeeds to acquire more information about a scattering object by means of click waveforms that appear to change very little from click to click. This scenario suggests that the dolphin is utilizing an iterative sounding and recognition "loop" that involves not only the object, but also its sound generation and sensing system and its auditory, motor, and other cortices. The corticonic network of the present invention may be employed to model the cortex part of this echoing loop to help understand or explain the dolphin's remarkable recognition abilities. With this model and its ensuing results, new designs of new generation of intelligent sonar and radar capable of automated object recognition can be realized.

Further, the present invention does not merely offer insight that helps to explain and predict cortical function and behavior, rather it also provides new tools for use in applications involving the recognition and generation of spatio-temporal signals. These applications may share the commonality that they are required to process the output of a filter bank that analyzes a waveform. A major obstacle yet not hurdled is how to form a representation of the output of the filter back that is invariant with time-warping (a form of non-uniform scaling of the input waveform in time). In the context of the corticonic networks offered by the present invention, this obstacle may be simply defined such that the normalized version of the output of the filter bank is $\vec{X}^s(n)$, the input to corticonic network 200. The corticonic network 200 can produce attractors that are invariant with slight time distortions of spatio-temporal input $\vec{X}^s(n)$ to the network. As such, the corticonic network may be employed to classify dynamic and/or static events as they unfold by means of sequences of attractors that may be subsequently identified because of their persistence and invariance with time warping.

CONCLUSION

In sum, the present invention provides system and methods that offer a dynamical brain model—a model that may be applied to various data processing applications. It is understood, however, that the invention is susceptible to various modifications and alternative constructions. There is no intention to limit the invention to the specific constructions described herein. On the contrary, the invention is intended to cover all modifications, alternative constructions and equivalents falling within the scope and spirit of the invention.

It should also be noted that the present invention may be implemented in a variety of computer enviromnents (including both non-wireless and wireless computer environments), partial computing environments, and real world environments. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A method to simulate cortical processing for use in processing data, comprising:
    segmenting a cortex into cortical columns, said cortical columns communicating with each other via short-range and longer-range communications paths;
    generating at least one parametrically coupled logistic map network (PCLMN) to model these communication paths, said PCLMN comprising one or more parametrically coupled logistic maps;
    using a difference equation in the PCLMN that represents neurons in the cortical columns in the modeling of the cortex; and
    configuring the PCLMN to perform acts comprising any of (a) handling dynamic and/or static input patterns, (b) handling large numbers of sensory stimuli, and (c) providing a solution to a plasticity-stability problem to memory formation.

2. A method to simulate cortical processing for use in processing data, comprising:
    segmenting a cortex into cortical columns, said cortical columns communicating with each other via short-range and longer-range communications paths;
    generating at least one parametrically coupled logistic map network (PCLMN) to model these communication paths, said PCLMN comprising one or more parametrically coupled logistic maps;
    using a difference equation in the PCLMN that represents neurons in the cortical columns in the modeling of the cortex;
    providing at least one dynamic and/or static input to said at least one PCLMN; and
    processing said at least one dynamic and/or static input by said PCLMN to determine a fixed-point attractor for said at least one dynamic and/or static input in state-space.

3. The method as recited in claim 2, further comprising:
    offering said at least said attractor by said PCLMN for similar or same said at least one dynamic and/or static input, said PCLMN engaging in adaptive learning to offer said attractor.

4. The method as recited in claim 3, further comprising:
    providing at least one additional cortical model module to cooperate with said at least one PCLMN to perform memorization and/or association operations, said at least one additional cortical module comprising any of a PCLMN and associative memory.

5. The method as recited in claim 4, further comprising:
    providing a feedback loop to allow for the design and implementation of desired state-space trajectories, said feedback loop originating from the output of said at least one additional cortical model module and terminating at the input of said at least one PCLMN.

6. The method as recited in claim 5 further comprising:
    labeling said determined attractor by said at least one additional cortical model module for association and storage.

7. The method as recited in claim 3, wherein said at least dynamic and/or static inputs comprise dynamic and/or static spatio-temporal stimuli.

8. The method as recited in claim 7, wherein said dynamic and/or static spatio-temporal stimuli originate from at least one filter, said filter comprising any of an electronic filter, a partially-electronic filter, and a biological filter.

9. A computer readable storage medium having computer readable instructions to perform the steps recited in claim 1.

10. A system to model cortical processing for use in processing data, comprising:
    a memory;
    at least one parametrically coupled logistic map network (PCLMN) stored in the memory, said PCLMN providing a dynamic and/or static non-linear representation of cortical connections as observed in a biological cortex using a difference equation that represents neurons in cortical columns,
    wherein said at least one PCLMN accepts at least one dynamic and/or static input and processes said dynamic and/or static input to identify a fixed-point attractor for said at least one dynamic and/or static input in state space,
    wherein said at least one PCLMN operates to adapt providing the same output to similar or same inputs thereby engaging in learning; and
    wherein said at least one dynamic and/or static input comprises at least one spatio-temporal stimulus.

11. A system to model cortical processing for use in processing data, comprising:
    a memory;
    at least one parametrically coupled logistic map network (PCLMN) stored in the memory, said PCLMN providing a dynamic and/or static non-linear representation of cortical connections as observed in a biological cortex using a difference equation that represents neurons in cortical columns,
    wherein said at least one PCLMN accepts at least one dynamic and/or static input and processes said dynamic and/or static input to identify a fixed-point attractor for said at least one dynamic and/or static input in state space,
    wherein said at least one PCLMN operates to adapt providing the same output to similar or same inputs thereby engaging in learning; and
    wherein said adaptation of said at least one PCLMN occurs through few iterations of inputs.

12. A system to model cortical processing for use in processing data, comprising:
a memory;
at least one parametrically coupled logistic map network (PCLMN) stored in the memory, said PCLMN providing a dynamic and/or static non-linear representation of cortical connections as observed in a biological cortex using a difference equation that represents neurons in cortical columns,
wherein said at least one PCLMN accepts at least one dynamic and/or static input and processes said dynamic and/or static input to identify a fixed-point attractor for said at least one dynamic and/or static input in state space,
wherein said at least one PCLMN operates to adapt providing the same output to similar or same inputs thereby engaging in learning; and
at least one additional cortical model module, said at least one additional cortical model module accepting the output of said at least one PCLMN as input and is capable of classifying in real time said output of said at least one PCLMN as being novel simulating memorization and/or association cortical functions.

13. The system as recited in claim 12, wherein said at least one additional cortical model module comprises any of a PCLMN and associative memory.

14. The system as recited in claim 13, wherein said at least one PCLMN and said at least one additional cortical model module are tandemly coupled.

15. The system as recited in claim 14, wherein said at least one PCLMN and said at least one additional cortical model operate synchronously.

16. The system as recited in claim 14 further comprising:
a feedback loop originating from the output of said at least one additional cortical model module and terminating at the input of said at least one PCLMN, wherein said feedback loop allowing for the design and implementation of desired state-space trajectories.

17. A method to model the cortex and use said model in order to process input data, comprising:
providing a corticonic network, said corticonic network comprising at least one parametrically coupled logistic map network (PCLMN) operating on at least one dynamic and/or static input, said at least one dynamic and/or static input comprising spatio-temporal stimulus and said PCLMN modeling cortical functions using a difference equation;
processing said at least one dynamic and/or static input using said corticonic network;
providing a fixed point attractor in state space for said at least one dynamic and/or static input; and
performing memorization and/or association on said outputs of said corticonic network, said corticonic network engaging in memorization through the use of at least one additional PCLMN tandemly coupled to said at least one PCLMN and operating to classify novel output data from said at least one PCLMN in order to process the input data.

18. A system modeling the cortex for use in processing data comprising:
a memory;
a corticonic network,
wherein said corticonic network comprises a first parametrically coupled logistic map network (PCLMN) stored in said memory, said first PCLMN accepting dynamic and/or static inputs and determining a fixed point attractor in state-space to describe at least one dynamic and/or static input, said first PCLMN models close-range intercortical connections by space-time filtering of the inputs in order to reduce redundancies in patterns of the inputs using an autonomous adaptation algorithm, and
wherein said corticonic network comprises a second PCLMN, said second PCLMN tandemly coupled to said first PCLMN to accept the output of said first PCLMN as input and operates to identify non-novel output of said first PCLMN, said identification of non-novel output representative of memorization and/or association cortical functions, and
wherein a feedback loop operates between the output of said second PCLMN and the input of said first PCLMN.

19. The system as recited in claim 18, wherein said corticonic network comprises a computing environment.

20. The method as recited in claim 18, wherein said second PCLMN exhibits associative memory attributes to label and associate attractors resulting from said first PCLMN.

21. A method of applying a dynamical brain model for processing data comprising:
identifying a data processing problem;
modeling the data processing problem in a corticonic network;
configuring said corticonic network to the parameters of said data processing problem;
executing said corticonic network using a computer, the corticonic network modeled by a parametrically coupled logistic map (PCLM) that models cortical functions using a difference equation;
using the corticonic network for processing the data and providing a processed output;
obtaining results from said execution of said corticonic network; and
verifying said results of said execution of said corticonic network by comparing said results of the processed output with a comparable real-world model.

22. A computer readable storage medium comprising computer readable instructions to perform the steps recited in claim 21 in order to process the input data.

23. The method as recited in claim 17, further comprising performing self-organization, wherein the self-organization comprises undertaking driven adaptation such that inputs to the corticonic network are rapidly classified using input-specific attractors.

24. The method as recited in claim 17, further comprising employing chaos principles to perform the driven adaptation.

25. The method as recited in claim 17, further comprising distinguishing between structured and random input patterns.

26. The method as recited in claim 17, further comprising ascertaining coexisting attractors that are uniquely accessed by the inputs.

27. The method as recited in claim 26, further comprising employing an associative memory network to label the attractors, wherein the associative memory network comprises a bank of -D optical holographic associative memories.

28. The method as recited in claim 17, further comprising labeling inputs with time specific attractors, wherein the attractor is exists for a set period of time.

29. The method as recited in claim 17, further comprising performing symmetry breaking, wherein the symmetry breaking is realized by randomly selecting a fraction of the processing elements and isolating the elements from their neighbors.

30. The method as recited in claim 29, further comprising partitioning the corticonic network into sub-networks of unequal size that are isolated from each other.

31. The method as recited in claim 17, further comprising inputting invariant feature-vector(s) of an object to the corticonic network.

32. The system as recited in claim 18, further comprising including a feedback from a labeling associated memory to the first PCLMN such that a cortical module is produces which is capable of producing discrete-time trajectories in the state-space of the cortical module.

33. The system as recited in claim 32, wherein the trajectories can be fashioned to provide the cortical module with categorical-perception and perceptual inference.

34. The method as recited in claim 21, further comprising processing spatio-temporal and static input patterns.

* * * * *